United States Patent
Botwright (10) Patent No.: US 12,000,374 B2
(45) Date of Patent: Jun. 4, 2024

(54) WIND TURBINE ALIGNMENT TOOL

(71) Applicant: Vestas Wind Systems A/S, Aarhus N (DK)

(72) Inventor: Adrian Botwright, Sabro (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/270,107

(22) PCT Filed: Dec. 23, 2021

(86) PCT No.: PCT/DK2021/050382
§ 371 (c)(1),
(2) Date: Jun. 28, 2023

(87) PCT Pub. No.: WO2022/148515
PCT Pub. Date: Jul. 14, 2022

(65) Prior Publication Data
US 2024/0077061 A1 Mar. 7, 2024

(30) Foreign Application Priority Data
Jan. 5, 2021 (EP) .................................. 21150158

(51) Int. Cl.
*F03D 13/10* (2016.01)
(52) U.S. Cl.
CPC ...... *F03D 13/112* (2023.08); *F05B 2230/604* (2013.01)
(58) Field of Classification Search
CPC ... Y02E 10/72; Y02E 10/727; F05B 2240/14; F05B 2230/604; F03D 13/20; F03D 13/112; F03D 13/10; F03D 13/126
See application file for complete search history.

(56) References Cited

FOREIGN PATENT DOCUMENTS

| EP | 2770199 A2 | 8/2014 |
|---|---|---|
| EP | 2748460 B1 | 6/2015 |
| EP | 3064309 B1 | 2/2018 |

OTHER PUBLICATIONS

International Searching Authoriy, International Search Report and Written Opinion issued in corresponding PCT Application No. PCT/DK2021/050382, mailed Feb. 8, 2022.
European Patent Office, extended European Search Report issued in corresponding EP Application No. 21150158.0, dated Jun. 23, 2021.

*Primary Examiner* — Moshe Wilensky
(74) *Attorney, Agent, or Firm* — Wood Herron & Evans LLP (57) ABSTRACT

A tool (600) for aligning tubular structures (200, 300) of a wind turbine comprises: a plurality of hanger members (601) configured to be pivotably attached to an end region of a first tubular structure (300) so as to extend axially outward therefrom, each of the hanger members comprising a guide part (605) adapted to engage an interior wall (203) of a second tubular structure (200); at least one cable (615) connecting the hanger members (601) together; and a tension mechanism arranged to adjust a tension of the at least one cable (615). The tension mechanism is operable to adjust said tension to pivot the guide parts (605) into engagement with the interior wall (203) of the second tubular structure (200) when the first tubular structure (300) is moved axially toward the second tubular structure (200), thereby to guide the first tubular structure (300) into axial alignment with the second tubular structure (200).

16 Claims, 6 Drawing Sheets

WIND TURBINE ALIGNMENT TOOL

FIELD OF THE INVENTION

The present invention relates to a tool for aligning tubular structures of a wind turbine, for example an offshore or onshore wind turbine.

BACKGROUND

A typical wind turbine includes a tubular tower, a nacelle located on the tower and containing a generator connected to a drive hub by a shaft, and rotor blades attached to the drive hub. During installation of the wind turbine onsite, the tower is assembled and the nacelle is attached to the top of the tower, typically using a flange-to-flange connection secured with bolts. For a proper connection, the flanges need to be centrally aligned so that the flanges are positioned face-to-face, and further rotationally aligned so that the boltholes of the flanges match.

The tower may comprise several segments that are placed one on top of the other in order to build the tower. Each of these segments is a large and heavy structure. So too is the nacelle. It is therefore necessary to lift the tower segments and the nacelle using a large crane or other hoisting equipment. These operations are made more difficult because they are typically carried out in non-ideal conditions, such as at sea or in uneven terrain.

In particular, the structures are susceptible to disturbance by wind loads during their installation. In the case of an offshore wind turbine, the tower is additionally subject to forces from water waves. As a result, the nacelle and tower may move laterally relative to each other, as the nacelle is lowered by crane toward the tower for attachment thereto. In a similar manner, upper and lower segments of the tower may move laterally relative to each other during construction of the tower. These lateral movements make it difficult to centrally align the structures and thereby achieve the required flange-to-flange connection between them. The present invention aims to alleviate this problem to at least some extent.

SUMMARY OF THE INVENTION

According to an aspect of the invention, there is provided a tool for aligning tubular structures of a wind turbine, comprising: a plurality of hanger members configured to be pivotably attached to an end region of a first tubular structure so as to extend axially outward therefrom, each of the hanger members comprising a guide part adapted to engage an interior wall of a second tubular structure; at least one cable connecting the hanger members together; and a tension mechanism arranged to adjust a tension of the at least one cable, wherein the tension mechanism is operable to adjust said tension to pivot the guide parts into engagement with the interior wall of the second tubular structure when the first tubular structure is moved axially toward the second tubular structure, thereby to guide the first tubular structure into axial alignment with the second tubular structure.

As used herein, "cable" means an elongate, flexible member able to sustain a tensile force, i.e. capable of being held in tension. Examples include, but are not limited to, wire cables, wire ropes, cords, chains, and the like.

The degree of tension in or of the cable is controllable by the tension mechanism in order to pivotally deploy the guide parts of the hanger members into engagement with the interior wall of the second tubular structure. Thus the first tubular structure is guided into axial alignment, or centered, with the second tubular structure. The guide parts exert an outward radial force on the interior wall, the magnitude of the outward radial force being dependent on the magnitude of tensile force in the cable. Thus the tension in the cable may be controlled in order to damp lateral oscillations or vibrations of the first and second tubular structures that are caused by the crosswinds. As a result of the damping, the shock of any contact, between the first and second tubular structures, is reduced or eliminated.

Thus the alignment tool provides for the first tubular structure to be progressively guided into axial alignment with the second tubular structure as the first tubular structure is moved axially toward the second tubular structure, all the while providing damping of oscillations or vibrations of the first and second tubular structures caused by crosswinds.

Each of the plurality of hanger members may comprise a support part including a first pivot feature for said pivotable attachment.

The support part may comprise a cable attachment feature for attaching the at least one cable to the hanger member, the cable attachment feature and the guide part being located on opposite sides of the first pivot feature, such that the tension mechanism is operable to adjust said tension to pivot the guide part into engagement with the interior wall of the second tubular structure.

Each of the plurality of hanger members may comprise an interface member for attachment to the end region of the first tubular structure, the interface member comprising a second pivot feature connected to the first pivot feature for said pivotable attachment.

The first pivot feature may comprise a through-hole formed in the support part of the hanger member; and the second pivot feature may comprise a clevis joint including a clevis pin which is received by the through-hole.

The interface member may comprise a resilient element arranged to abut the support part of the hanger member, the resilient element being: elastically deformable so as to allow said pivoting of the guide part into engagement with the interior wall of the second tubular structure due to said adjustment of said tension; and elastically recoverable so as to oppose said tension so as to bias the guide part away from the interior wall of the second tubular structure.

The tool may comprise a plurality of brace members each configured to brace a respective one of the hanger members against an interior wall of the first tubular structure, thereby to limit the extent of a pivotal movement of the guide parts away from the interior wall of the second tubular structure.

Each of the plurality of brace members may be formed integrally with and extend from the support part of the respective one of the hanger members, an end portion of each brace member being adapted to engage the interior wall of the first tubular structure.

Each of the plurality of brace members may comprise an extension part of the interface member, the extension part comprising a through-hole for receiving a fastener; and the tool may further comprise a plate adapted to engage each of the extension part and the interior wall of the first tubular structure such as to be located there between, the plate including a threaded hole for receiving a threaded portion of the fastener in order to secure the plate to the extension part, thereby for a head portion of the fastener to abut the support part of the hanger member. Preferably the fastener is adjustable so as to vary the distance between the head portion and the interior wall of the first tubular structure.

The plate may comprise a resilient material for said engagement with the interior wall of the first tubular structure.

The tension mechanism may comprise: an actuator comprising a movable part connected to the at least one cable and arranged to move the at least one cable in order to adjust said tension; and a controller arranged to control the movable part of the actuator.

The actuator may comprise a hydraulic cylinder and the movable part may comprise a piston thereof.

The actuator may comprise an electromechanical linear actuator and the movable part may comprise a screw shaft thereof.

The tension mechanism may comprise: a spring having first and second ends connected to respective portions of the at least one cable; a clamp arranged to selectively compress and relax the spring; and a controller arranged to control the clamp.

According to another aspect of the invention, there is provided a wind turbine generator, at least partially installed and comprising a tool as described herein above.

According to another aspect of the invention, there is provided a method of installing a wind turbine generator, comprising: pivotably attaching a plurality of hanger members of an alignment tool to an end region of a first tubular structure of the wind turbine generator so as to extend axially outward therefrom, each of the hanger members comprising a guide part adapted to engage an interior wall of a second tubular structure of the wind turbine generator, the hanger members being connected together by at least one cable of the tool; and moving the first tubular structure axially toward the second tubular structure and operating a tension mechanism of the tool in order to adjust a tension of the at least one cable, thereby to pivot the guide parts into engagement with the interior wall of the second tubular structure so as to guide the first tubular structure substantially into axial alignment with the second tubular structure.

According to another aspect of the invention, there is provided a use of a tool as described herein above in a method as described herein above.

BRIEF DESCRIPTION OF THE DRAWINGS

Embodiments will now be described, by way of example, with reference to the accompanying figures in which.

DETAILED DESCRIPTION

Figure 1:
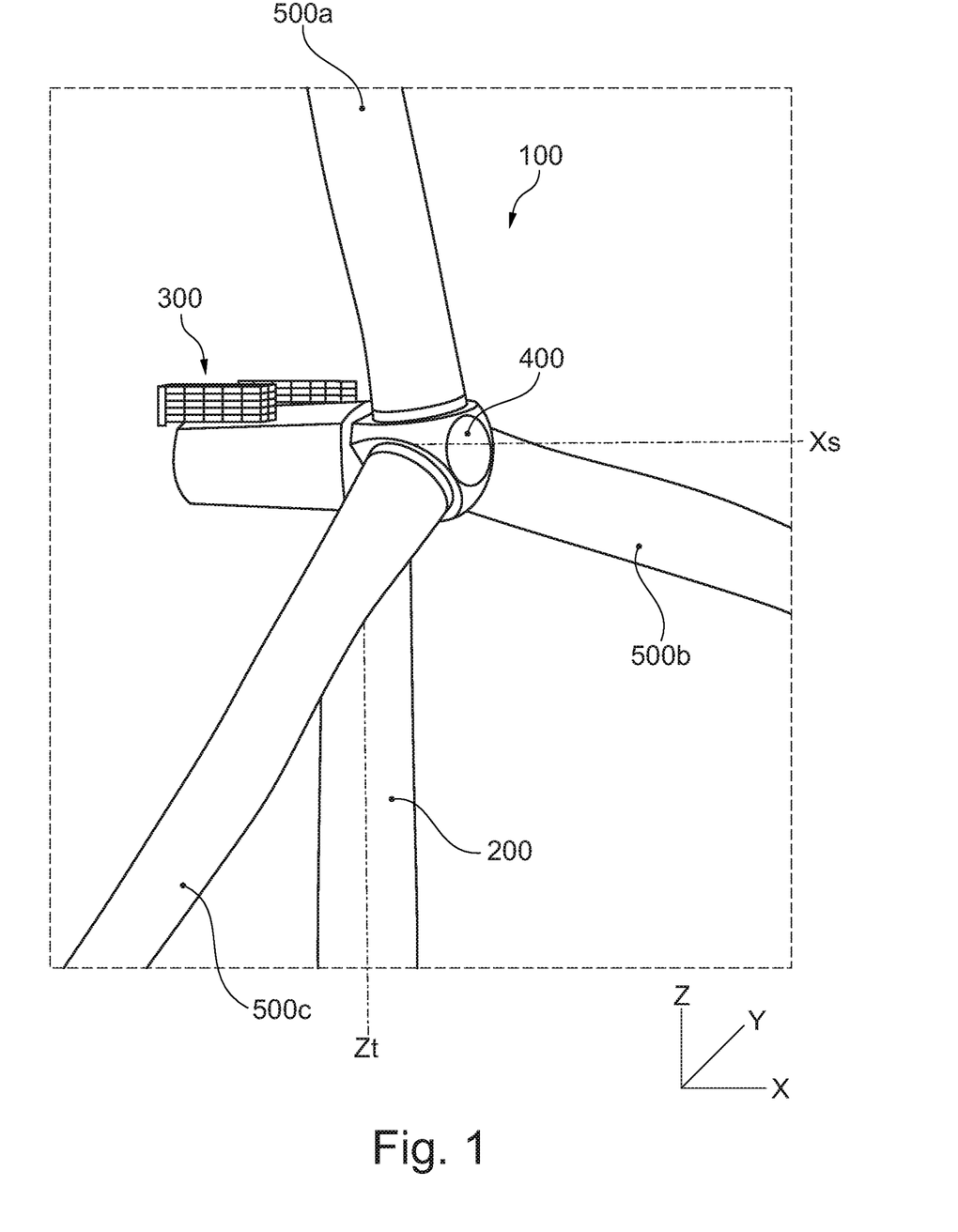
FIG. 1 shows a wind turbine including a nacelle mounted on a tower.
Figure 2:
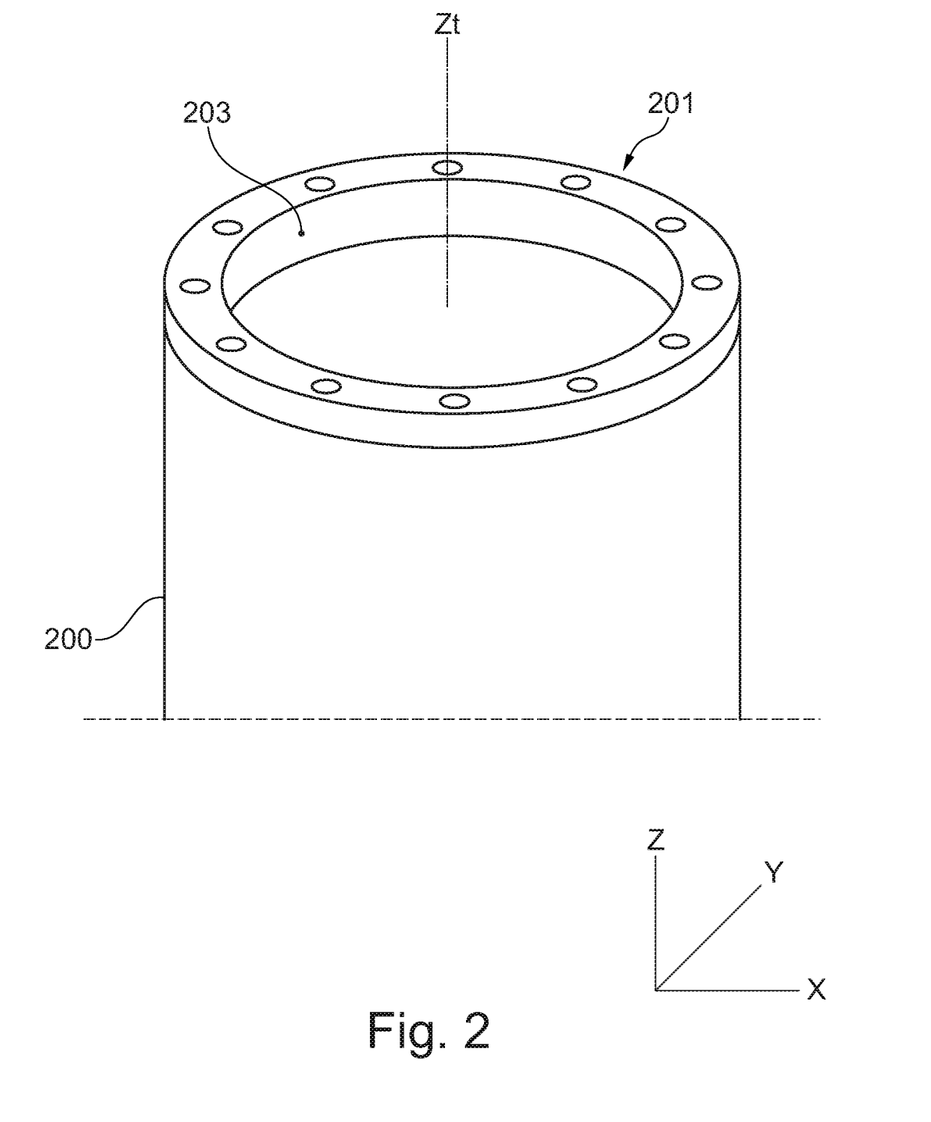
FIG. 2 shows an upper part of the tower in isolation.

Referring to FIGS. 1 and 2, an exemplary offshore wind turbine 100 comprises a tower 200 (having a mass of around 200-500 tonnes), a nacelle 300 (around 300-500 tonnes), a rotor hub 400, and a plurality of rotor blades 500a-c.

The tower 200 comprises a tubular (e.g. cylindrical) structure having a longitudinal or vertical axis Zt. A lower end of the tower 200 (not shown) is fixed in the seabed. The nacelle 300 is mounted to the tower 200. Although not shown in FIG. 1, a tubular, e.g. cylindrical, structure 301 of the nacelle 300 having a longitudinal or vertical axis Zn extends downwardly from a lower surface of the nacelle 300. The base of the tubular structure 301 of the nacelle 300 comprises a flange part 303 that is attached by bolts to a complementary flange part 201 of the upper end of the tower 200 (see FIG. 2). The nacelle 300 further comprises a housing 301 containing a generator (not shown). The rotor hub 400 extends from the nacelle 300 and is connected to the generator by a horizontally arranged shaft (not shown) having an axis Xs that is substantially perpendicular to the longitudinal axis Zt of the tower 200. The rotor blades 500a-c are attached to the rotor hub 400. In use of the wind turbine 100, a wind force acting on the rotor blades 500a-c causes the rotor blades 500a-c to rotate about the horizontal axis Xs, thereby to drive the generator via the shaft to produce electrical energy.

The installation of the nacelle 300 on the tower 200 is performed with the aid of an alignment tool, which will now be described.

Figure 3:
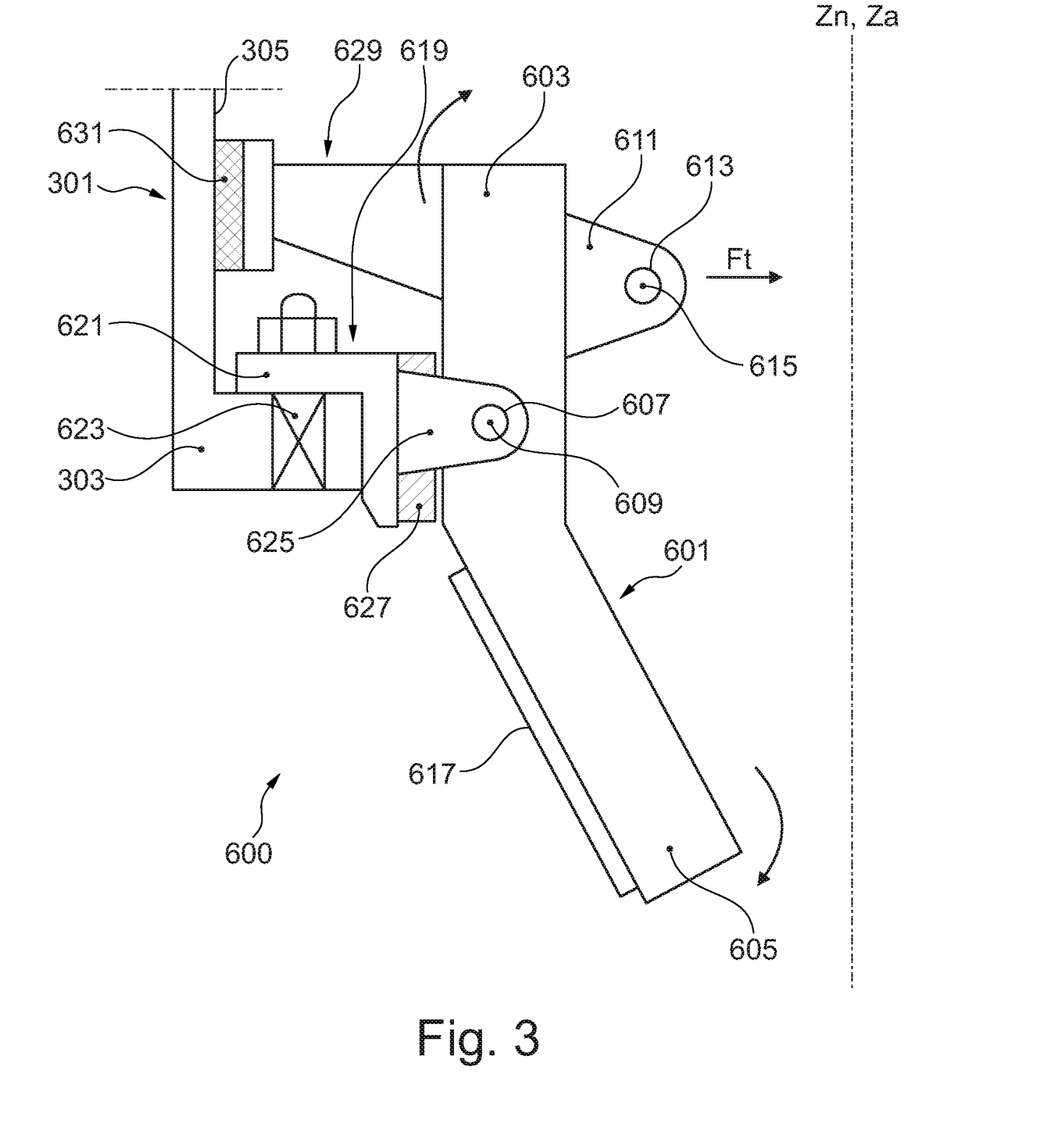
FIG. 3 shows a side view of a part of a tool according to a first example of the invention, the tool being attached to a lower part of the nacelle.
Figure 4:
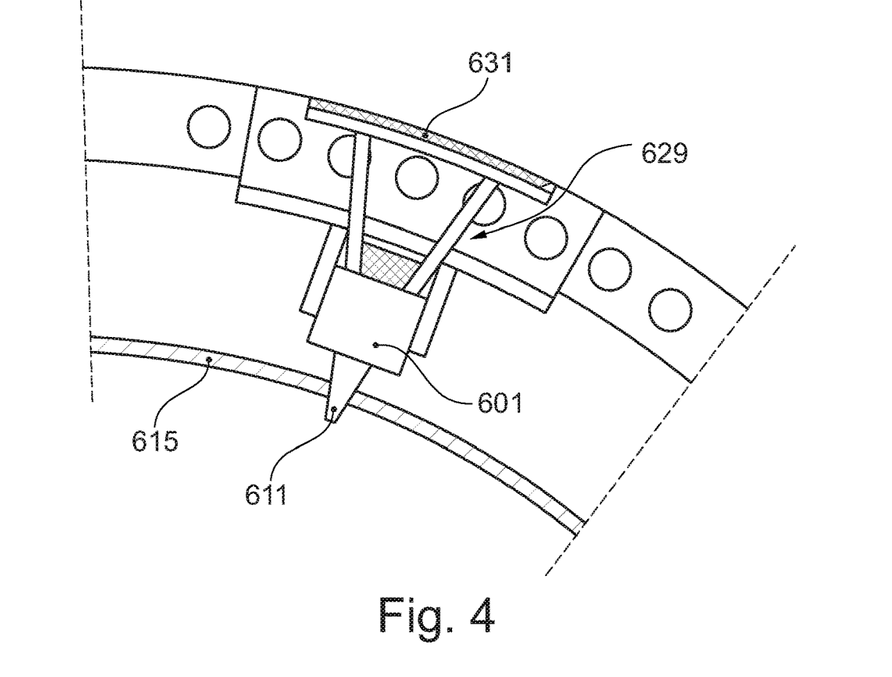
FIG. 4 shows a top view of the part of the tool, which is attached to a cable of the tool.
Figure 5:
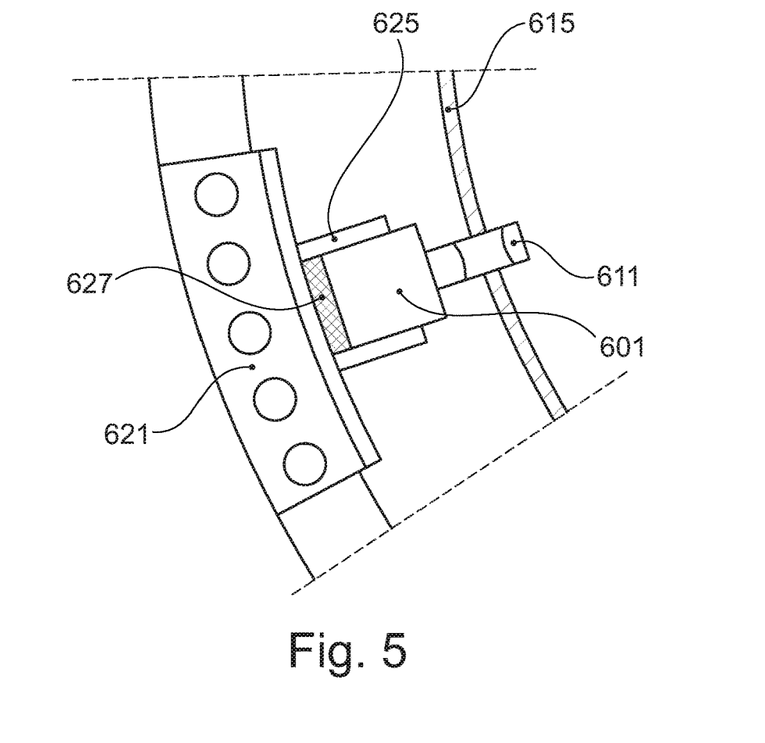
FIG. 5 shows a cut-through top view of the part of the tool and the cable.

Referring to FIGS. 3 to 6, an exemplary alignment tool 600 comprises a plurality of hanger members 601 (only one of which is shown in FIGS. 3 to 5), each connected to the flange part 303 of the tubular structure 301 of the nacelle 300 (only part of which is shown in FIGS. 3 to 5). In this example, the tool 600 comprises seven of the hanger members 601 (see FIG. 6), which are regularly spaced apart from each other around the circumference of the flange part 303, and equally radially-spaced from the longitudinal axis Zn of the tubular structure 301. Thus, when so arranged on the flange part 303, the tool 600 has a vertical or longitudinal axis Za, which is coincident with, i.e. lies along, the longitudinal axis Zn of the tubular structure 301.

In this example, each hanger member 601 comprises steel. In this example, each hanger member 601 comprises a bend that defines a support portion 603 and a guide portion 605 of the hanger member 601. As shown in FIG. 3, when the hanger member 601 is connected to the flange part 303 of the tubular structure 301 of the nacelle 300, the support portion 603 extends vertically such as to be substantially parallel with the longitudinal axis Zn of the tubular structure 301 of the nacelle 300, while the guide portion 605 extends radially inwardly such as to be inclined with respect to the longitudinal axis Zn.

The support portion 603 comprises a through-hole 607 which receives a clevis pin 609. The support portion 603 further comprises an extension lug 611 including a through-hole 613. A cable 615 of the tool 600 is received in the through-hole 613. In this example, the cable 615 comprises steel. The guide portion 605 comprises a curved outer face 617 configured to conform to the curved interior flange wall 203 of the tower 200 (see FIG. 2).

In this example, the tool 600 further comprises an interface member 619 for attaching the hanger member 601 to the flange part 303 of the tubular structure 301 of the nacelle 300. In this example, the interface member 619 comprises steel. The interface member 619 comprises a flange portion 621 having outer faces configured to engage the flange part 303 of the tubular structure 301 of the nacelle 300. The flange portion 621 is secured to the flange part 303 by at least one fastener, in this example an expansion fastener, in particular an expansion bolt 623. The interface member 619 further comprises a clevis joint portion 625 which extends radially inwardly from the flange portion 621 and receives the support portion 603 of the hanger member 601. The hanger member 601 is supported by the clevis pin 609 which passes transversely through the clevis joint portion 625.

Thus the hanger member 601 is pivotably attached to the flange part 303 of the tubular structure 301 of the nacelle 300 and extends axially outward therefrom. That is, the hanger member 601 hangs or depends downwardly from the clevis pin 609 and is in pivotal and rotational relationship with the flange part 303. The clevis pin 609 extends in a direction which is substantially perpendicular to the longitudinal axis Zn of the tubular structure 301 of the nacelle 300 and the hanger member 601 is rotatable about the clevis pin 609 in a plane which intersects the longitudinal axis Zn.

In this example, the interface member 619 further comprises a resilient element 627, more particularly a rubber block, mounted to an inner face of the flange portion 621 so as to be located between the flange portion 621 and an outer face of the support portion 603 of the hanger member 601.

In this example, the tool 600 further comprises a brace member 629 for bracing the hanger member 601 against the interior wall 305 of the tubular structure 301 of the nacelle 300. In this example, the brace member 629 comprises steel. In this example, the brace member 629 is formed integrally with the hanger member 601. The brace member 629 extends outwardly from the support portion 603 of the hanger member 601 and includes a curved outer face 631 configured to conform to the curved interior wall 305 of the tubular structure 301 of the nacelle 300 (see FIGS. 2 and 4). In this example, the curved outer face 631 comprises a resilient material, for example rubber, for protecting the curved interior wall 305 from impact damage.

Figure 6:
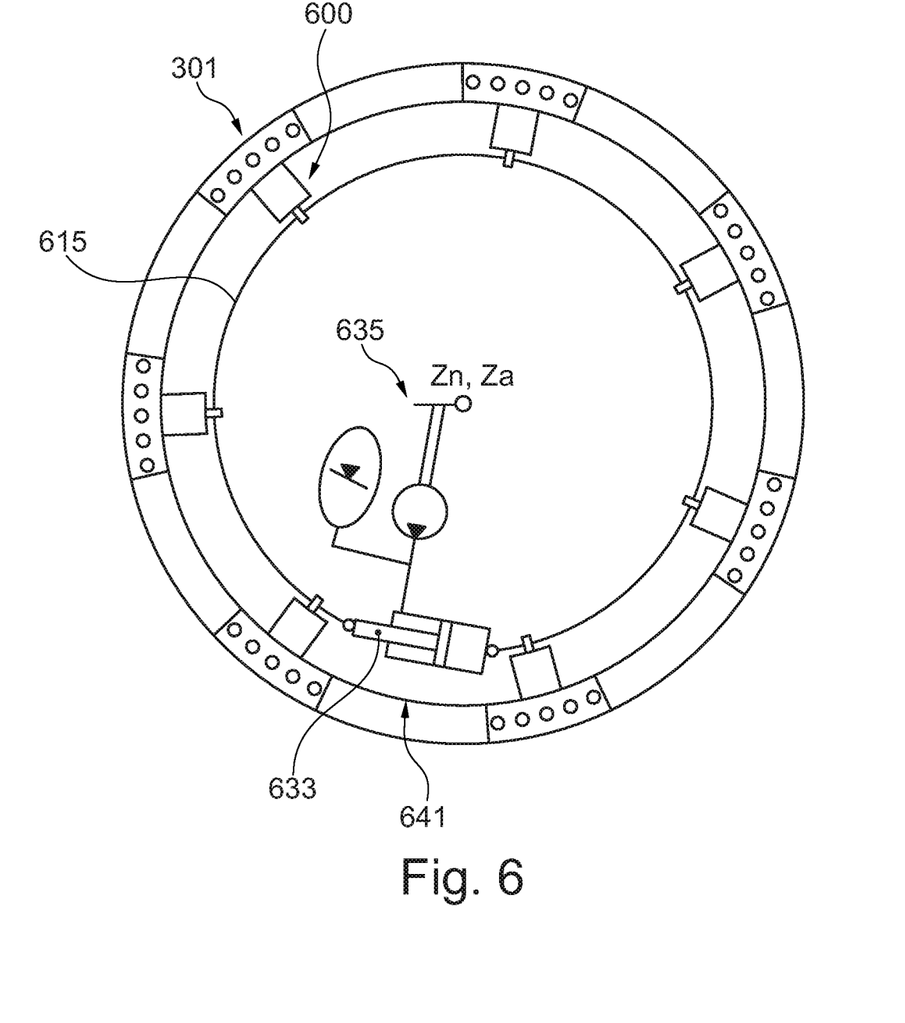
FIG. 6 shows a top view of a plurality of the parts of the tool, spaced around a circumference of the lower part of the nacelle and connected together by the cable, along with a tension mechanism of the tool for controlling the tension of the cable.

Referring in particular to FIG. 6, the cable 615 is arranged in a circular fashion, the circle formed by the cable 615 being substantially concentric with the circular flange part 303 of the tubular structure 301 of the nacelle 300. The tool 600 further comprises a tension mechanism arranged to control the tension of the cable 615, as will be described later herein. The tension mechanism comprises an actuator, in this example a hydraulic cylinder 641, located between two ends of the cable 615. The hydraulic cylinder 641 contains a hydraulic fluid, e.g. oil, and comprises a movable, horizontally arranged piston 633 having a head portion in contact with the fluid and a stem portion which extends out of a first end of the hydraulic cylinder 641. A controller 635 is connected to the hydraulic cylinder 641 and is configured to control the hydraulic fluid therein in order to displace the piston 633. The control of the hydraulic fluid and the piston 633 may be achieved in various ways, for example a hand-pump to pressurise the fluid and an accumulator to function as a "spring". Alternatively the accumulator may be replaced by a return spring in the hydraulic cylinder 641.

A first end of the cable 615 is attached to the stem portion of the piston 633 such as to be movable with the piston 633. The second end of the cable 615 is attached to the opposite end of the body of the hydraulic cylinder 641 such as to be in fixed relationship therewith. That is, the second end of the cable 615 is anchored to said opposite end of the hydraulic cylinder 641.

As shown in FIG. 6, the head portion of the piston 633 is at a mid-way position in the hydraulic cylinder 641. In this position the tension mechanism is in a neutral condition, wherein the cable 615 is taut and free of slack but is not subject to a high tensile load. In this neutral condition, the hanger members 601 are in the position shown in FIG. 3. This represents the position of the hanger members 601 after attachment to the flange part 303 of the tubular structure 301 of the nacelle 300, but prior to activation of the hanger members 601, to bring the tubular structure 301 into axial alignment with the tower 200 so as to enable the flange-to-flange connection to be made.

In this pre-activation position, the support portion 603 of the hanger member 601 is in abutment with the resilient element 627 of the interface member 619, but does not exert a compressive load on the resilient element 627 sufficient to cause deformation of the resilient element 627.

Also in this pre-activation position, the curved outer face 631 of the brace member 629 is in abutment with the interior wall 305 of the tubular structure 301 of the nacelle 300.

Further in this pre-activation position, the guide portion 605 of the hanger member 601 is located radially inward of the flange part 303 of the tubular structure 301 of the nacelle 300. Furthermore, no part or portion of the alignment tool 600 extends laterally of the tubular structure 301. That is, the entirety of the alignment tool 600 is contained within a circle projected downward from the outer diameter of the tubular structure 301.

Still further in this pre-activation position, the guide portions 605 of the plurality of hanger members 601 together define a circle having a diameter which is smaller than the inner diameter of the upper part of the tower 200.

The use of the alignment tool 600 in installing the nacelle 300 on the tower 200 will now be described.

Referring again to FIGS. 2 to 6, at the beginning of the alignment procedure the alignment tool 600 is attached to the flange part 303 of the tubular structure 301 of the nacelle 300, and the hanger members 601 are in the pre-activation position, as has been described herein above.

The nacelle 300 is positioned above the tower 200, e.g. using a crane, so that the tower 200 and the tubular structure 301 of the nacelle 300 are approximately in vertical alignment. The nacelle 300 is then lowered toward the tower 200. Due to disturbance forces exerted on the nacelle 300 by crosswinds, the nacelle 300 may move horizontally, i.e. left-right, as well as vertically, i.e. down. As a result, the longitudinal axis Zn of the tubular structure 301 of the nacelle 300 is displaced laterally of the longitudinal axis Zt of the tower 200. The lateral displacement may be up to about 2 metres, depending on the strength of the crosswinds.

As the nacelle 300 is lowered, the curved outer face 617, of one or more of the inwardly inclined guide portions 605 of the plurality of hanger members 601 (see FIG. 3), will come into contact with the inner rim of the flange part 201 of the upper end of the tower 200 (see FIG. 2). As the nacelle 300 travels further downwardly, the inwardly inclined guide portions 605 will be guided down over the inner rim, under the weight of the nacelle 300, such that the longitudinal axis Zn of the tubular structure 301 of the nacelle 300 will be moved laterally toward the longitudinal axis Zt of the tower 200.

It will be understood that, as any one of the guide portions 605 moves laterally into contact with the inner rim of the flange part 201 of the upper end of the tower 200, the inner rim will exert a reaction force (rightward in the sense of FIG. 3) on the guide portion 605. It will be further understood that the reaction force will not cause the hanger member 601 to pivotally rotate about the clevis pin 609 (i.e. counter-clockwise in the sense of FIG. 3). Such rotation of the hanger member 601 will be resisted, both by the brace member 629, whose curved outer face 631 is in abutment with the curved interior wall 305 of the tubular structure 301 of the nacelle 300, and by the tensile force Ft in the cable 615, which acts radially inward. Thus the hanger member 601 is substantially rigid in rotation and will not be deflected by the reaction force of the inner rim of the flange part 201 of the upper end of the tower 200.

Thus the inclined guide portions 605 of the hanger members 601 function to generally guide the nacelle 300 toward axial alignment with the tower 200, even while the nacelle 300 is still subject to lateral movement due to crosswinds. The lateral displacement of the nacelle 300 will therefore be limited by the presence of the alignment tool 600. That is, lateral movement of the nacelle 300 will be resisted by contact between the guide portions 605 and the inner rim of the flange part 201.

As the nacelle 300 is lowered further, the hanger members 601 are activated in order to bring the nacelle 300 into axial alignment with the tower 200, as follows.

Referring again to FIG. 6, the controller 635 is actuated to displace the hydraulic fluid in the hydraulic cylinder 641, thereby causing the piston 633 to move further into the hydraulic cylinder 641, such as to reduce the length of the stem portion that extends externally of the body of the hydraulic cylinder 641. Since the first end of the cable 615 is attached to the stem portion, the cable 615 is pulled by the piston 633 and slides through the through-holes 613 of the extension lugs 611 of the hanger members 601. As a result, the distance between the first and second ends of the cable 615 is reduced and the tension in the cable 615 is increased.

Referring now again to FIG. 3, the tensile force Ft in the cable 615 (acting radially inward, to the right in the sense of FIG. 3 as shown by the arrow) pulls on the extension lug 611 of each hanger member 601. The force Ft is transmitted to the resilient element 627 of the interface member 625, via the outer face of the support portion 603 of the hanger member 601, and is sufficient to cause elastic deformation of the resilient element 627 (in particular, the lower part of the resilient element 627 in the sense of FIG. 3), so that the hanger member 601 is rotated about the clevis pin 609 (clockwise in the sense of FIG. 3, as shown by the arrows). As a result, the curved outer face 617 of the guide portion 605 advances toward and engages with the curved interior flange wall 203 of the tower 200. At the same time, the curved outer face 631 of the brace member 629 disengages from the interior wall 305 of the tubular structure 301 of the nacelle 300 and the support part 603 of the hanger member 601 moves radially inward (to the right in the sense of FIG. 3). Thus the circle, which is formed by the cable 615 that passes through the extension lugs 611 of the hanger members 601, is reduced in diameter.

When so engaged with the curved interior flange wall 203, the hanger member 601 is in an activated position. It will be understood that, when the plurality of hanger members 601 are in the activated position, the curved outer faces 617 together define a circle having a diameter which is substantially equal to the inner diameter of the upper part of the tower 200.

Thus, in the activated position, the curved outer faces 617 of the guide portions 605 exert an outward radial force on the curved interior flange wall 203 of the tower 200, thereby causing the tubular structure 301 of the nacelle 300 to become centred over the tower 200, such that the longitudinal axis Zn of the tubular structure 301 is in at least approximate axial alignment with the longitudinal axis Zt of the tower 200.

The movement of the piston 633 in the hydraulic cylinder 641 may be controlled, so that the increase of the tensile force Ft in the cable 615 is gradual, rather than substantially instantaneous. In this way, the curved outer faces 617 of the guide portions 605 advance toward and engage with the curved interior flange wall 203 of the tower 200 in a progressive manner, thereby avoiding the risk of a shock impact which could cause damage.

As the nacelle 300 is lowered still further toward the tower 200 in the final stage of the alignment procedure, the curved outer faces 617 of the guide portions 605 slide down along the curved interior flange wall 203 of the tower 200. At this time the tension in the cable 615 may be controlled, so that the outward radial force, exerted by the curved outer faces 617, is sufficiently great to keep the tubular structure 301 in axial alignment with the tower 200, but not so great as to prevent the curved outer faces 617 from smoothly sliding down the curved interior flange wall 203 of the tower 200, i.e. under the weight of the nacelle 300.

If the progression of the curved outer faces 617 over the curved interior flange wall 203 is not smooth, the friction between the two surfaces can be reduced by reducing the tensile force Ft in the cable 615. To achieve this, the controller 635 is actuated to displace the hydraulic fluid in the hydraulic cylinder 641 so as to cause the piston 633 to move back in the opposite direction, i.e. such as to increase the length of the stem portion that extends externally of the body of the hydraulic cylinder 641. Accordingly, the distance between the first and second ends of the cable 615 is increased such that the cable 615 is slackened slightly. Referring again to FIG. 3, the magnitude of the tensile force Ft is therefore reduced. Thus the elastically deformed resilient element 627 is able to recover to some extent, i.e. due to the energy stored in the resilient element 627 by its earlier compression, such as to exert a counterforce (acting radially inward, to the right in the sense of FIG. 3) on the outer face of the support portion 603 of the hanger member 601. As a result, the hanger member 601 is rotated back slightly about the clevis pin 609 (counter-clockwise in the sense of FIG. 3), thereby reducing the pressure applied to the curved interior flange wall 203 by the curved outer face 617. Thus the recovering resilient element 627 functions to bias the guide portion 605 away from the curved interior flange wall 203, at least to the extent allowed by the level of tension in the cable 615. The resilient element 627 also functions as a shock absorber.

Thus the tensile force Ft in the cable 615 may be controlled to enable the smooth, downward progression of the nacelle 300. Furthermore, the tension in the cable 615 may be controlled to keep the tubular structure 301 in axial alignment with the tower 200 while the nacelle 300 is still subject to small lateral movements due to crosswinds. Furthermore, the tension in the cable 615 may be controlled in order to dampen the lateral motion of the nacelle 300 due to crosswinds.

At last, the flange part 303 of the tubular structure 301 of the nacelle 300 comes into engagement with the flange part 201 of the upper end of the tower 200. Thus the nacelle 300 is brought to rest atop the tower 200. In this stationary position, the curved outer faces 617 of the guide portions 605 remain in contact with the curved interior flange wall 203 of the tower 200, such that the tubular structure 301 of the nacelle 300 is in substantially perfect axial alignment with the tower 200.

Thus the alignment tool 600 provides for the tubular structure 301 of the nacelle 300 to be progressively guided into axial alignment with the tower 200 as the nacelle 200 is lowered toward the tower 200, all the while providing damping of oscillations or vibrations of the nacelle 300 and tower 200 structure caused by crosswinds.

With the nacelle 300 resting on the tower 200, if required the nacelle 300 may be yawed, i.e. rotated about the longitudinal axes Zn, Zt of the nacelle 300 and the tower 200, in order to align the boltholes of the flange part 303 of the tubular structure 301 of the nacelle 300 with the boltholes of the flange part 201 of the upper end of the tower 200. In this regard, the flange part 303 of the tubular structure 301 may be described as a yaw interface between the nacelle 300 and the tower 200. Once the boltholes are aligned, bolts may be installed in the boltholes in order to firmly attach the nacelle 300 to the tower 200.

The alignment tool 600 is preferably then removed, to improve access to the structure for personnel and to allow for the alignment tool 600 to be re-used with another wind turbine. In order to remove the alignment tool 600, the cable 615 may be slackened, in the manner described herein above, so that the hanger members 601 are returned to their pre-activated positions. The expansion bolts 623 may then be removed to enable removal of the tool 600 from the flange part 303 of the tubular structure 301.

Figure 7:
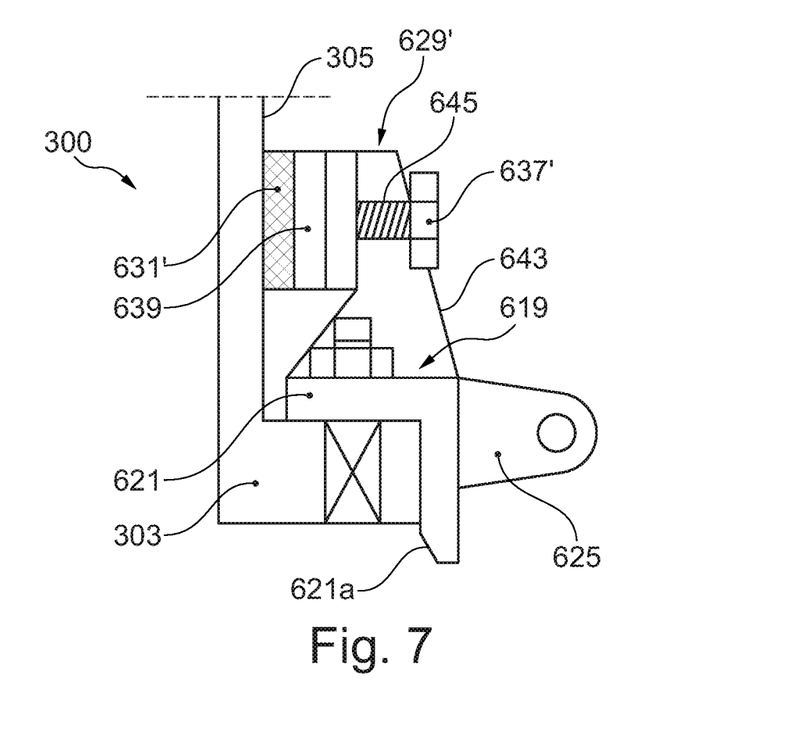
FIGS. 7 and 8 show means for bracing the part of the tool against the nacelle.
Figure 8:
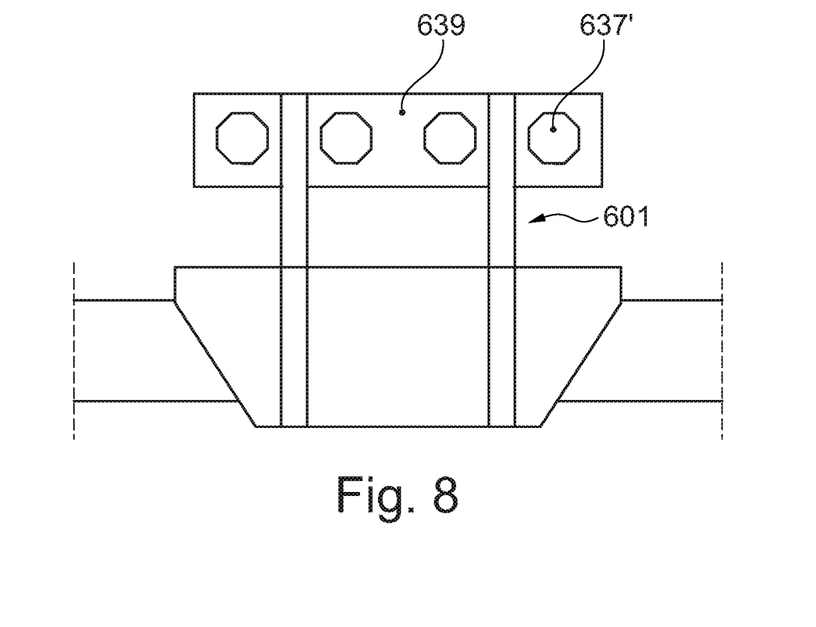

While in the above-described example the brace member 629 is formed integrally with the hanger member 601, in another example the brace member is formed integrally with the interface member 619. Such an example is shown in FIGS. 7 and 8, wherein a brace member 629' comprises an extension part 643 of the interface member 619. A through-hole 645 is formed in the extension part 643. In this example, the brace member 629' comprises steel.

A plate 639 of the tool 600 comprises a curved side 631' for engagement with the interior wall 305 of the first tubular structure 300. In this example, the curved side 631' comprises a resilient material, for example rubber, for protecting the curved interior wall 305 from impact damage. An opposite side of the plate 639 is adapted to conform to an outer face of the extension part 643 of the interface member 619. The plate 639 comprises a threaded hole (not shown in FIGS. 7 and 8).

As can be seen most clearly in FIG. 7, the plate 639 is located between the extension part 643 of the interface member 619 and the interior wall 305 of the first tubular structure (300). A fastener, in this example a bolt 637', is received by the through-hole of the extension part 643 and extends to the plate 639. A threaded end of the bolt 637' is engaged with the threaded hole of the plate 639 such as to fixedly attach the plate 639 to the extension part 643. A head end of the bolt 637' is positioned to abut the support part 603 of the hanger member 601 (not shown in FIG. 7). In this example, the bolt 637' may be finely adjusted (left/right in the sense of FIG. 7) so as to bring the head of the bolt 637' into the precise desired position for said abutment.

Still referring to FIG. 7, in an example an outer face of the flange portion 621 of the interface member 619 comprises a chamfer 621a, to provide secondary final fine alignment of the flanges, and ovality correction, prior to the flanges coming together.

While in the above-described examples the alignment tool comprises seven hanger members, the tool may comprise any other suitable number of the hanger members. For example, the tool may comprise three, four, five, six, eight, nine, ten, or more, of the hanger members.

In the above-described examples, the resilient element 627 of the interface member 619 comprises a rubber block. It will be understood that the resilient element 627 may take a variety of other forms, for example one or more springs. All of these other forms are within the scope of the claimed invention, provided that they function to bias the guide portion 605 away from the curved interior flange wall 203, and, preferably, additionally function as a shock absorber, as described herein above.

While in the above-described examples the alignment tool 600 comprises an interface member 619, for attaching the hanger member 601 to the flange part 303 of the tubular structure 301 of the nacelle 300, in other examples the tool 600 does not include an interface member 619. In such examples, the flange part 303 of the tubular structure 301 of the nacelle 300 may itself include some structural feature for pivotable attachment of the hanger member 601. For example, the flange part 303 may comprise an integral clevis joint portion which extends from the rim of the flange part 303 for receiving the hanger member 601 on the clevis pin 609. It will therefore be understood that the interface member 619 is not an essential feature of the tool 600. Rather, it is only required that the hanger member 601 can be pivotably mounted to the flange part 303 in some way, whether directly to the flange part 303 itself, or indirectly by some intermediate element.

While in the above-described examples the alignment tool 600 comprises a brace member 629, 629', in other examples the tool 600 does not include a brace member. As has been described herein above, the brace member 629, 629' helps the hanger member 601 to resist rotation, under the reaction force exerted on the guide portion 605 by the inner rim of the flange part 201 of the upper end of the tower 200. In other examples, the tool 600 does not include a brace member. In such examples, the resistance to rotation of the hanger member 601, under said reaction force, may be provided by the tensile force Ft in the cable 615, which acts radially inward. It will therefore be understood that the brace member 629, 629' is not an essential feature of the tool 600.

While in the above-described examples the alignment tool 600 comprises a clevis joint 621; 609 for providing a pivotable connection between the hanger member 601 and the flange part 303 of the tubular structure 301 of the nacelle 300, it will be understood that various other types of pivotal connections may be contemplated. All of these other types are within the scope of the claimed invention, provided that they provide the pivotable connection.

In the above-described examples, the cable 615 is connected to the extension lug 611 of the hanger member 601, the extension lug 611 being located on one side of the clevis pin 609 on which the hanger member 601 pivots, while the guide portion 605 of the hanger member 601 is located on the other side of the clevis pin 609. Thus the guide portion 605 is advanced radially outward, toward the curved interior flange wall 203 of the tower 200, when the tensile force Ft of the cable 615 is increased so as to pull the extension lug 611 radially inward.

In other examples, the hanger member 601 is differently configured, such that the guide portion 605 is advanced radially outward when the tensile force Ft of the cable 615 is reduced. In one such example, the extension lug 611 for the cable connection is provided on the guide portion 605 of the hanger member 601, and the tool 600 includes a bias member, for example a compressed spring located between the support portion 603 and the curved interior wall 305 of the tubular structure 301 of the nacelle 300, which is arranged to apply a force to bias the guide portion 605 toward the curved interior flange wall 203 of the tower 200. In this example, in the pre-activation position the cable 615 is held in tension, i.e. by the tension mechanism, in order to hold the biased guide portion 605 away from the curved interior flange wall 203 of the tower 200. The hanger member 601 is activated by slackening the cable 615, i.e.

reducing the tensile force Ft in the cable, so that the guide portion 605 is advanced toward the curved interior flange wall 203 under the force of the bias member.

It will be understood that the hanger member 601 may be configured in a variety of ways with regard to the location of the pivot and the cable connection. In some of these configurations the guide portion 605 is advanced when the tension in the cable 615 is increased, while in others the guide portion 605 is advanced when the tension in the cable 615 is reduced. All of these configurations are within the scope of the claimed invention, provided that adjusting the tensile force Ft in the cable 615 causes or allows the guide portion 605 to advance toward the curved interior flange wall 203 of the tower 200.

While in the above-described examples the tension mechanism comprises a hydraulic cylinder, other examples of the tool comprise different kinds of actuators for adjusting the tension of the cable, some of which will now be described.

In one example, the tension mechanism comprises an electromechanical linear actuator 641' located between the two ends of the cable 615. The electromechanical linear actuator 641' comprises a movable, horizontally arranged screw shaft 633'. The screw shaft 633' comprises a driven portion, which is engaged with a drive gear located within the housing of the electromechanical linear actuator 641', and a stem portion, which extends out of a first end of the electromechanical linear actuator 641'. A controller 635' is connected to the electromechanical linear actuator 641' and is configured to control the drive gear in order to displace the screw shaft 633'. The screw shaft 633' of the electromechanical linear actuator 641' is thus analogous to the piston 633 of the above-described hydraulic actuator 631.

The first end of the cable 615 is attached to the stem portion of the screw shaft 633' such as to be movable with the screw shaft 633'. The second end of the cable 615 is attached to the opposite end of the body of the electromechanical linear actuator 641' such as to be in fixed relationship therewith. That is, the second end of the cable 615 is anchored to said opposite end of the electromechanical linear actuator 641'.

At a certain position of the screw shaft 633', the tension mechanism is in the above-mentioned neutral condition, wherein the cable 615 is taut and free of slack but is not subject to a high tensile load. Thus the hanger members 601 are in their pre-activation position, as has been described herein above.

During the alignment procedure, the controller 635' is actuated to rotate the drive gear, thereby causing the screw shaft 633' to move further into the electromechanical linear actuator 641', such as to reduce the length of the stem portion that extends externally of the body of the electromechanical linear actuator 641'. Since the first end of the cable 615 is attached to the stem portion, the cable 615 is pulled by the screw shaft 633' and slides through the through-holes 613 of the extension lugs 611 of the hanger members 601. As a result, the distance between the first and second ends of the cable 615 is reduced and the tension in the cable 615 is increased. Accordingly the hanger members 601 are activated in the manner described herein above.

The movement of the screw shaft 633' in the electromechanical linear actuator 641' may be controlled, so that the increase of the tensile force Ft in the cable 615 is gradual, rather than substantially instantaneous. In this way, the curved outer faces 617 of the guide portions 605 advance toward and engage with the curved interior flange wall 203 of the tower 200 in a progressive manner, thereby avoiding the risk of a shock impact which could cause damage, as already mentioned herein above.

Also as described herein above, if the progression of the curved outer faces 617 over the curved interior flange wall 203 is not smooth, the friction between the two surfaces can be reduced by reducing the tensile force Ft in the cable 615. To achieve this, the controller 635' is actuated to rotate the drive gear so as to cause the screw shaft 633' to move back in the opposite direction, i.e. such as to increase the length of the stem portion that extends externally of the body of the electromechanical linear actuator 641'. Accordingly, the distance between the first and second ends of the cable 615 is increased such that the cable 615 is slackened slightly. As has been described herein above, the hanger member 601 is thus rotated back slightly about the clevis pin 609, thereby reducing the pressure applied to the curved interior flange wall 203 by the curved outer face 617.

In another example, the tension mechanism actuator comprises a spring 641", preferably a coil spring, which is located between the ends of the cable and is connected thereto. The spring may be controlled to be moved between different degrees of compression/expansion in order to vary the distance between the ends of the cable. For example, a screw clamp 633" may be engaged with the spring and adjusted by a controller 635" so as to selectively compress and relax the spring, thereby to control the tension of the cable in order for the tool to function as has been described herein above. More simply, the screw clamp may be arranged to allow the spring to move from a compressed condition to a relaxed condition, or vice versa, thereby to alter the cable tension so as to move the hanger members from the pre-activated position to the activated position.

It will be understood that the actuators described herein above are just some examples of actuators which are suitable for use in a tension mechanism according to the claimed invention. Other suitable actuators include, but are not limited to: mechanical actuators; electromechanical actuators; pneumatic actuators; and telescoping linear actuators. All of these are within the scope of the claimed invention, provided that they function to adjust the tension in the cable.

In the above-described examples, the tension mechanism actuator is arranged such that the ends of the cable are brought closer together in order to increase the tension in the cable. In other examples, the ends of the cable may be moved apart in order to increase the tension in the cable. In one such example, a first end of the cable is reverse-looped around or pulley, or similar, such that moving said first end away from the second end of the cable causes an increase in the cable tension. All such arrangements are within the scope of the claimed invention, provided that they function to move at least a portion of the cable in order to adjust the tension in the cable.

In the above-described examples, the alignment tool 600 comprises one, single cable 615, which is arranged in a circular fashion to connect the hanger members 601 together. In other examples, the tool 600 comprises a plurality of cables for connecting the hanger members 601 together, either directly or indirectly. In one such example, a plurality of cables are arranged radially, in the manner of bicycle spokes, the outer ends of the cables being connected to the individual hangers and the inner ends being attached to a common, central ring. The central ring is arranged to be moved by the tension mechanism, for example in rotation or in an up/down motion, in order to adjust the tension in the cables and thereby activate the hanger members 601. In another example, the hanger members are arranged in pairs so as to be diametrically opposite to each other, each one of each pair of the hanger members being connected to the other, opposite one of the pair by a cable. It will be understood that various other cable arrangements may be contemplated and all of these are within the scope of the claimed invention, provided that they function to adjust the tension in one or more cables in order to activate the hanger members 601.

While in the above-described examples the alignment tool has been described in respect of the axial alignment of a tubular tower and a tubular part of a nacelle, it will be understood that the alignment tool is equally suitable for the axial alignment of other tubular structures of a wind turbine, for example tubular segments or sections of a wind turbine tower. The alignment tool is suitable for any internal flange connection, nacelle-to-tower, tower-to-tower, or tower-to-foundation, connection. An example is a nacelle and an RNA (Rotor Nacelle Assembly, i.e. a nacelle and hub with blades). It will be further understood that the alignment tool is also suitable for use with tubular structures that are non-cylindrical, for example oval, elliptical, or rectangular tubular structures of wind turbines.

It should be understood that the invention has been described in relation to its preferred embodiments and may be modified in many different ways without departing from the scope of the invention as defined by the accompanying claims.

The invention claimed is:

1. A tool for aligning tubular structures of a wind turbine, comprising:
   a plurality of hanger members configured to be pivotably attached to an end region of a first tubular structure so as to extend axially outward therefrom, each of the hanger members comprising a guide part adapted to engage an interior wall of a second tubular structure;
   at least one cable connecting the hanger members together; and
   a tension mechanism arranged to adjust a tension of the at least one cable,
   wherein the tension mechanism is operable to adjust said tension to pivot the guide parts into engagement with the interior wall of the second tubular structure when the first tubular structure is moved axially toward the second tubular structure, thereby to guide the first tubular structure into axial alignment with the second tubular structure.

2. The tool according to claim 1, wherein each of the plurality of hanger members comprises a support part including a first pivot feature for said pivotable attachment.

3. The tool according to claim 2, wherein the support part comprises a cable attachment feature for attaching the at least one cable to the hanger member, the cable attachment feature and the guide part being located on opposite sides of the first pivot feature, such that the tension mechanism is operable to adjust said tension to pivot the guide part into engagement with the interior wall of the second tubular structure.

4. The tool according to claim 2, wherein each of the plurality of hanger members comprises an interface member for attachment to the end region of the first tubular structure, the interface member comprising a second pivot feature connected to the first pivot feature for said pivotable attachment.

5. The tool according to claim 4, wherein:
   the first pivot feature comprises a through-hole formed in the support part of the hanger member; and
   the second pivot feature comprises a clevis joint including a clevis pin which is received by the through-hole.

6. The tool according to claim 4, wherein the interface member comprises a resilient element arranged to abut the support part of the hanger member, the resilient element being:
   elastically deformable so as to allow said pivoting of the guide part into engagement with the interior wall of the second tubular structure due to said adjustment of said tension; and
   elastically recoverable so as to oppose said tension so as to bias the guide part away from the interior wall of the second tubular structure.

7. The tool according to claim 2, comprising a plurality of brace members each configured to brace a respective one of the hanger members against an interior wall of the first tubular structure, thereby to limit the extent of a pivotal movement of the guide parts away from the interior wall of the second tubular structure.

8. The tool according to claim 7, wherein each of the plurality of brace members is formed integrally with and extends from the support part of the respective one of the hanger members, an end portion of each brace member being adapted to engage the interior wall of the first tubular structure.

9. The tool according to claim 7, wherein:
   each of the plurality of hanger members comprises an interface member for attachment to the end region of the first tubular structure, the interface member comprising a second pivot feature connected to the first pivot feature for said pivotable attachment;
   each of the plurality of brace members comprises an extension part of the interface member, the extension part comprising a through-hole for receiving a fastener; and
   the tool further comprises a plate adapted to engage each of the extension part and the interior wall of the first tubular structure such as to be located there between, the plate including a threaded hole for receiving a threaded portion of the fastener in order to secure the plate to the extension part, thereby for a head portion of the fastener to abut the support part of the hanger member,
   wherein the fastener is adjustable so as to vary the distance between the head portion and the interior wall of the first tubular structure.

10. The tool according to claim 9, wherein the plate comprises a resilient material for said engagement with the interior wall of the first tubular structure.

11. The tool according to claim 1, wherein the tension mechanism comprises:
    an actuator comprising a movable part connected to the at least one cable and arranged to move the at least one cable in order to adjust said tension; and
    a controller arranged to control the movable part of the actuator.

12. The tool according to claim 11, wherein the actuator comprises a hydraulic cylinder and the movable part comprises a piston thereof.

13. The tool according to claim 11, wherein the actuator comprises an electromechanical linear actuator and the movable part comprises a screw shaft thereof.

14. The tool according to claim 1, wherein the tension mechanism comprises:
    a spring having first and second ends connected to respective portions of the at least one cable;
    a clamp arranged to selectively compress and relax the spring; and
    a controller arranged to control the clamp.

15. A wind turbine generator, at least partially installed and comprising a tool according to claim 1.

16. A method of installing a wind turbine generator, comprising:
   pivotably attaching a plurality of hanger members of an alignment tool to an end region of a first tubular structure of the wind turbine generator so as to extend axially outward therefrom, each of the hanger members comprising a guide part adapted to engage an interior wall of a second tubular structure of the wind turbine generator, the hanger members being connected together by at least one cable of the tool; and
   moving the first tubular structure axially toward the second tubular structure and operating a tension mechanism of the tool in order to adjust a tension of the at least one cable, thereby to pivot the guide parts into engagement with the interior wall of the second tubular structure so as to guide the first tubular structure substantially into axial alignment with the second tubular structure.

\* \* \* \* \*